United States Patent
Song et al.

(10) Patent No.: US 10,417,148 B2
(45) Date of Patent: Sep. 17, 2019

(54) BUS SYSTEM AND BUS TRAFFIC CONTROL APPARATUS FOR CONTROLLING THE SAME

(71) Applicant: Samsung Electronics Co., Ltd., Suwon-si, Gyeonggi-do (KR)

(72) Inventors: In-Chul Song, Ansan-si (KR); Yong Kim, Hwaseong-si (KR); Seong-Wook Cho, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/784,544

(22) Filed: Oct. 16, 2017

(65) Prior Publication Data
US 2018/0181506 A1 Jun. 28, 2018

(30) Foreign Application Priority Data
Dec. 23, 2016 (KR) .................. 10-2016-0178044

(51) Int. Cl.
| G06F 13/16 | (2006.01) |
| G06F 13/22 | (2006.01) |
| G06F 13/364 | (2006.01) |
| G06F 13/42 | (2006.01) |

(52) U.S. Cl.
CPC ........ G06F 13/225 (2013.01); G06F 13/1642 (2013.01); G06F 13/1673 (2013.01); G06F 13/364 (2013.01); G06F 13/4282 (2013.01)

(58) Field of Classification Search
CPC combination set(s) only.
See application file for complete search history.

(56) References Cited

U.S. PATENT DOCUMENTS

| 6,460,107 B1 * | 10/2002 | Rao ..................... G06F 11/3409 710/305 |
| 6,539,439 B1 * | 3/2003 | Nguyen .............. G06F 13/4059 710/100 |
| 7,054,987 B1 * | 5/2006 | Reed ....................... G06F 13/16 710/310 |
| 7,594,057 B1 * | 9/2009 | Gandhi ................. G06F 13/128 710/22 |
| 8,032,675 B2 * | 10/2011 | Chang ................... G06F 12/023 710/56 |
| 8,149,874 B2 | 4/2012 | Ching et al. |
| 8,443,222 B1 * | 5/2013 | Niimura ................ G06F 11/221 710/15 |

(Continued)

FOREIGN PATENT DOCUMENTS

KR 20160098925 A 8/2016

*Primary Examiner* — Raymond N Phan
(74) *Attorney, Agent, or Firm* — Harness, Dickey & Pierce, P.L.C.

(57) ABSTRACT

A bus traffic control apparatus includes a sizing block, a traffic request controller and a bus master engine. The sizing block is configured to determine a data transmitting size of a bus master based on bus traffic information. The traffic request controller is configured to control transmission of data from the bus master based on the data, a destination of the data, the data transmitting size. The bus master engine is configured to transmit the data to the destination in the data transmitting size based on the data, the destination of the data, the data transmitting size and a request received from the traffic request controller.

20 Claims, 9 Drawing Sheets

(56) References Cited

U.S. PATENT DOCUMENTS

| | | |
|---|---|---|
| 8,601,536 B2 | 12/2013 | Liu et al. |
| 8,793,420 B2 | 7/2014 | Roh |
| 9,268,970 B2 * | 2/2016 | Grafton .................. G06F 21/74 |
| 9,286,257 B2 | 3/2016 | Hofmann et al. |
| 2005/0182886 A1 * | 8/2005 | Edirisooriya ....... G06F 13/4027 710/310 |
| 2007/0143521 A1 * | 6/2007 | Raju ...................... G06F 13/28 710/310 |
| 2007/0233923 A1 | 10/2007 | Lee |
| 2009/0100201 A1 * | 4/2009 | Moch ...................... H04L 1/24 710/34 |
| 2014/0129746 A1 * | 5/2014 | Zhou ........................ G06F 5/14 710/56 |
| 2014/0195833 A1 | 7/2014 | Wang et al. |
| 2014/0333779 A1 | 11/2014 | Shin |
| 2015/0067213 A1 | 3/2015 | Takeuchi |
| 2016/0232125 A1 | 8/2016 | Han et al. |

\* cited by examiner

FIG. 3

| MON. INTERVAL [L-1:0] | NUM. OF ACC. [M-1:0] | AVERAGE EFFICIENCY FOR READ[N-1:0] | AVERAGE EFFICIENCY FOR WRITE[N-1:0] |
| --- | --- | --- | --- |

BUS SYSTEM AND BUS TRAFFIC CONTROL APPARATUS FOR CONTROLLING THE SAME

CROSS-REFERENCE TO RELATED APPLICATION

This application claims priority under 35 USC § 119 to Korean Patent Application No. 10-2016-0178044, filed on Dec. 23, 2016 in the Korean Intellectual Property Office (KIPO), the contents of which are herein incorporated by reference in their entirety.

BACKGROUND

1. Technical Field

Some example embodiments relate to a bus traffic control apparatus and a bus system having the bus traffic control apparatus. More particularly, some example embodiments relate to a bus traffic control apparatus maintaining traffic of the bus system in an optimal condition and preventing system crashes and a bus system having the bus traffic control apparatus.

2. Description of the Related Art

An SOC indicates a chip or a system on the chip in which various semiconductor components are integrated as one chip. As convergence and integration is progressed between computers, communication devices, and other processing devices, the recent market trend is away from conventional application specific integrated circuits (ASICs) and application specific standard products (ASSPs), toward SOC technologies. In addition, miniaturization trends and high-performance requirements of electronic devices have factored into continuing development of the SOC.

More components are integrated in one chip, and with an increase of integration degree of the SOC, an operational speed of the SOC also increases gradually. The method of connecting various intellectual properties IPs in the chip also becomes more important.

The SOC may include a bus, a plurality of processors, a plurality of bus masters and a plurality of bus slaves which are connected to the bus. There is the plurality of the bus masters so that the traffic of the bus masters may be adjusted.

Conventionally, priorities of the bus masters are adjusted or resources of the bus masters are restricted to adjust the traffic. However, in the conventional methods, overflow may be generated in the bus master having a low priority, a usage of bandwidth of the bus may be limited and real-time traffic situations may not be dynamically reflected to the system.

Furthermore, if throughput of a specific bus increases unexpectedly, a system crash may occur.

SUMMARY

Some example embodiments of the present inventive concepts provide a bus traffic control apparatus maintaining traffic of a bus system in an optimal condition and preventing system crash.

Some example embodiments of the present inventive concepts also provide a bus system including the bus traffic control apparatus.

In an example embodiment of a bus traffic control apparatus according to the present inventive concepts, the bus traffic control apparatus includes a sizing block, a traffic request controller and a bus master engine. The sizing block is configured to determine a data transmitting size of a bus master based on bus traffic information. The traffic request controller is configured to control transmission of data from the bus master based on the data, a destination of the data, the data transmitting size. The bus master engine is configured to transmit the data to the destination in the data transmitting size based on the data, the destination of the data, the data transmitting size and a request received from the traffic request controller.

In an example embodiment of a bus system according to the present inventive concepts, the bus system includes a bus, at least one bus monitor, a plurality of bus masters and a plurality of bus slaves. The bus is configured to transmit data. The bus monitor is connected to the bus and configured to determine bus traffic information. The bus masters are connected to the bus and configured to generate control signals. The bus slaves are connected to the bus and configured to receive or output the data according to the control signals of the plurality of bus masters. At least one of the plurality of bus masters includes a bus traffic control apparatus. The bus traffic control apparatus includes a sizing block configured to determine a data transmitting size of the bus master based on the bus traffic information, a traffic request controller configured to control data transmission of the bus master based on the data, a destination of the data, the data transmitting size and a bus master engine configured to transmit the data to the destination in the data transmitting size based on the data, the destination of the data, the data transmitting size and a request which are received from the traffic request controller.

According to the bus traffic control apparatus and the bus system including the bus traffic control apparatus, a data transmitting size of a bus master is determined based on bus traffic information and the data are transmitted to a destination in the data transmitting size. Accordingly, when the throughput of a specific bus increases unexpectedly, the traffic generated by the bus masters may be gradually decreased in a range not affecting a system performance. When the problem of the throughput of the specific bus is solved, the traffic may be gradually increased. Thus, the unexpected increase of the throughput of the specific bus may be solved without system crash.

A bus system including a bus, at least one bus monitor, and at least one bus master. The bus is configured to transmit data. The at least one bus monitor is configured to determine bus traffic information. The at least one bus master is configured to control bus traffic on the bus based on the bus traffic information, data received by the at least one bus master, and a destination of the data received by the at least one bus master, including adjusting a data transmitting size for data transmitted through at least one bus master based on the bus traffic information.

In addition, when a specific bus is able to allow more traffic, the bus masters connected to the specific bus may generate more traffic to improve the system performance.

Therefore, the traffic of the bus system may be maintained in the optimal condition, a system crash is prevented, and the system performance may be improved.

BRIEF DESCRIPTION OF THE DRAWINGS

The above and other features and advantages of the present inventive concepts will become more apparent by describing in detailed example embodiments thereof with reference to the accompanying drawings, in which:

FIG. 3 is a conceptual diagram illustrating packetized traffic information of FIG. 2;

DETAILED DESCRIPTION OF THE EMBODIMENTS

Figure 1:
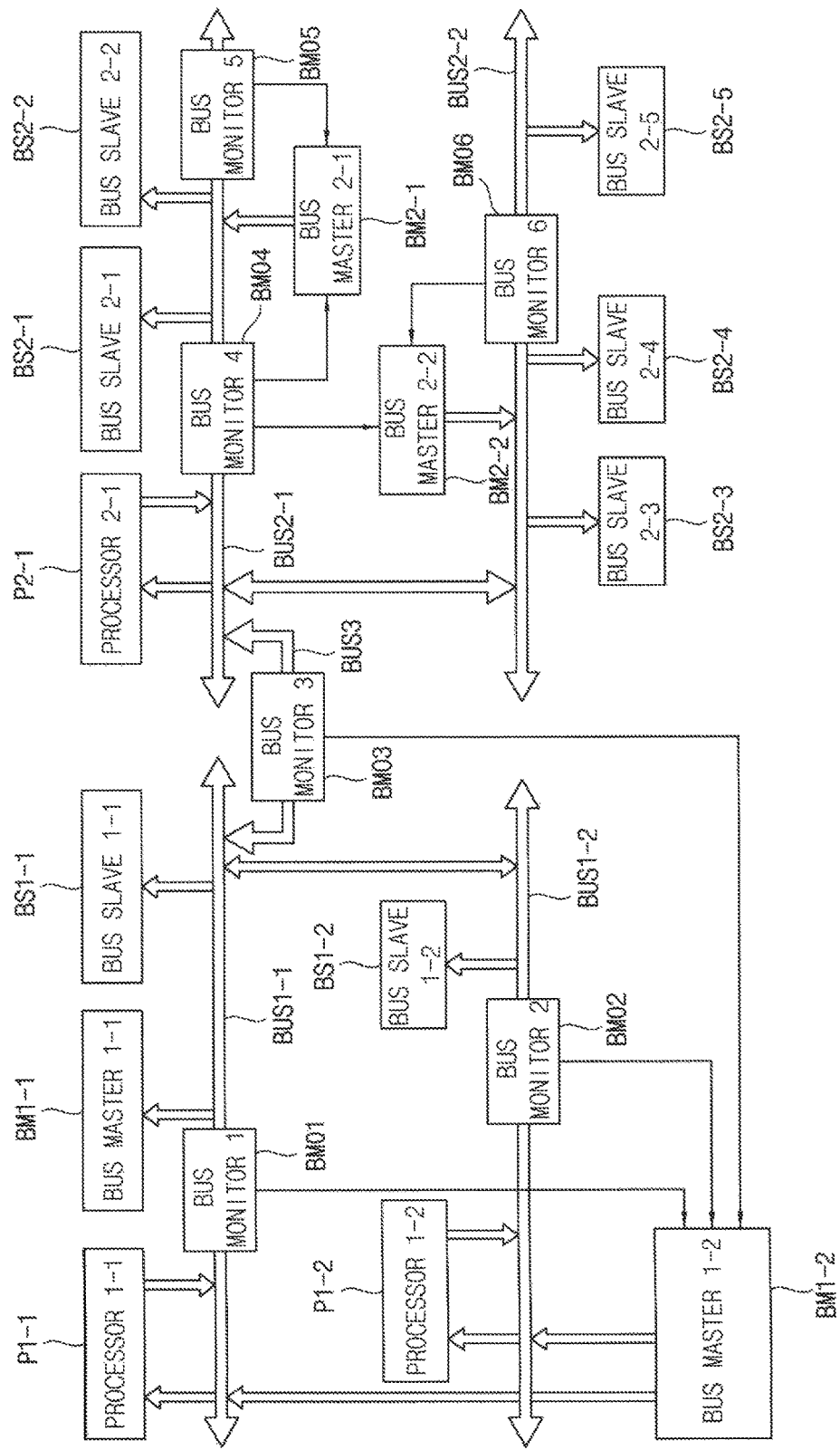
FIG. 1 is a block diagram illustrating a bus system according to an example embodiment.

Various example embodiments will be described more fully with reference to the accompanying drawings. The present disclosure may, however, be embodied in many different forms and should not be construed as limited to the example embodiments set forth herein. Like reference numerals refer to like elements throughout this application.

FIG. 1 is a block diagram illustrating a bus system according to an example embodiment.

Referring to FIG. 1, the bus system includes a bus transmitting data, a bus monitor connected to the bus and determining bus traffic information, a plurality of bus masters connected to the bus and generating a control and a plurality of bus slaves connected to the bus and receiving or outputting the data according to the control of the bus master. The bus system may further include a processor connected to the bus.

For example, the bus system may include a plurality of the buses BUS1-1, BUS1-2, BUS2-1, BUS2-2 and BUS3, a plurality of the processors P1-1, P1-2 and P2-1, a plurality of the bus masters BM1-1, BM1-2, BM2-1 and BM2-2, a plurality of the bus slaves BS1-1, BS1-2, BS2-1, BS2-2, BS2-3, BS2-4 and BS2-5 and a plurality of bus monitors BMO1, BMO2, BMO3, BMO4, BMO5 and BMO6.

The bus system may include a plurality of sub systems.

For example, a first sub system may include a first bus BUS1-1, a first processor P1-1 connected to the first bus BUS1-1, a first bus master BM1-1 connected to the first bus BUS1-1, a first bus slave BS1-1 connected to the first bus BUS1-1 and a first bus monitor BMO1 monitoring traffic status of the first bus BUS1-1.

For example, a second sub system may include a second bus BUS1-2, a second processor P1-2 connected to the second bus BUS1-2, a second bus master BM1-2 connected to the second bus BUS1-2, a second bus slave BS1-2 connected to the second bus BUS1-2 and a second bus monitor BMO2 monitoring traffic status of the second bus BUS1-2.

For example, a third sub system may include a third bus BUS2-1, a third processor P2-1 connected to the third bus BUS2-1, a third bus master BM2-1 connected to the third bus BUS2-1, a third bus slave BS2-1 and a fourth bus slave BS2-2 which are connected to the third bus BUS2-1 and a fourth bus monitor BMO4 and a fifth bus monitor BMO5 monitoring traffic status of the third bus BUS2-1.

For example, a fourth sub system may include a fourth bus BUS2-2, a fourth bus master BM2-2 connected to the fourth bus BUS2-2, a fifth bus slave BS2-3, sixth bus slave BS2-4 and a seventh bus slave BS2-5 which are connected to the fourth bus BUS2-2 and a sixth bus monitor BMO6 monitoring traffic status of the fourth bus BUS2-2.

For example, the bus system may further include a fifth bus BUS3 connecting the first bus BUS1-1 of the first sub system and the third bus BUS2-1 of the third sub system and a third bus monitor BMO3 monitoring traffic status of the fifth bus BUS3.

At least one of the bus masters may include a bus traffic control apparatus. The bus traffic control apparatus may receive the bus traffic information from the bus monitors and adjust a data transmitting size of the bus master based on the bus traffic information.

For example, the second bus master BM1-2 may receive the traffic information of the first bus BUS1-1, the second bus BUS1-2 and the fifth bus BUS3 from the first bus monitor BMO1, the second bus monitor BMO2 and the third bus monitor BMO3. The second bus master BM1-2 may adjust the size of the data transmitting size of the second bus master BM1-2 based on the traffic information.

For example, the third bus master BM2-1 may receive the traffic information of a first side of the third bus BUS2-1 with respect to the third bus master BM2-1 and the traffic information of a second side of the third bus BUS2-1 with respect to the third bus master BM2-1 from the fourth bus monitor BMO4 and the fifth bus monitor BMO5. The third bus master BM2-1 may adjust the size of the data transmitting size of the third bus master BM2-1 based on the traffic information.

For example, the fourth bus master BM2-2 may receive the traffic information of the third bus BUS2-1 and the fourth bus BUS2-2 from the fourth bus monitor BMO4 and the sixth bus monitor BMO6. The fourth bus master BM2-2 may adjust the size of the data transmitting size of the fourth bus master BM2-2 based on the traffic information.

As explained above, the bus masters may be connected to the different bus monitors.

The bus system may include at least one of the bus masters not including the bus traffic control apparatus. A bus master not including the bus traffic control apparatus may be called a priority bus master. The priority bus master has high importance such that the priority bus master highly affects to the system performance if the traffic of the priority bus master is decreased. Thus, although the overall traffic of the bus system is increased, the traffic of the priority bus master may not be decreased but maintained.

For example, the first bus master BM1-1 of the bus system in FIG. 1 may be the priority bus master not including the bus traffic control apparatus.

The bus master may be divided into a hard realtime master, a soft realtime master and a best effort master depending on the type or the operational characteristic of the master.

The hard realtime master is a master such as a display device that consumes data steadily and thus requires a necessary bandwidth. The underrun of a data buffer in the hard realtime master may be caused if the necessary bandwidth is not satisfied. The hard realtime master buffers the serviced data sufficiently in the data buffer if the necessary bandwidth is satisfied and controls the request flow itself such that the hard realtime master issues the request according to the amount of the consumed data.

To reduce manufacturing cost, an external modern chip may share a memory in the SOC. Such external modem chip may not operate normally if an average latency requirement level is not satisfied. It is difficult to determine and fix the average latency requirement level because the type of the modem chip is various.

The soft realtime master is a master such as a video codec that requires an average operation time. The video codec has a frame rate such as 30 or 60 frames per second and requires an average decode/encode time. The bandwidth requirement level of the video codec may be changed according to respective frames and the video codec requires an average encoding time and/or an average decoding time. The video codec tends to proceed the encoding/decoding of the next frame as soon as possible if the request flow is not controlled but the issue of the requests is limited due to dependency between the previously and currently processed data. Thus the operation speed of the video codec may satisfy the determined frame rate if the required bandwidth and/or latency are secured, but the operation speed of the codec may be sharply decreased if the latency becomes greater than a threshold value.

The best effort master is a master such as two-dimensional and three-dimensional graphics engine that issues requests endlessly if the request flow is not controlled and thus the request flow control is essential in the best effort master. It is desirable to support maximum service requirement level of the best effort master if the other master of higher priority than the best effort master is not in the urgent state. If the other master is in the urgent state, the request flow from the best effort master has to be limited so that the other master of the higher priority may escape from the urgent state.

The latency-oriented master such as a central processing unit (CPU) has a variable bandwidth requirement level depending on the situation but its performance is directly influenced by an average latency. The request flow of the latency-oriented master has to be controlled based on the latency because the average bandwidth requirement level may not be defined.

For example, the bus traffic control apparatus may be applied to the best effort master among the bus masters. If the bus traffic control apparatus is applied to the best effort master, the traffic of the bus masters may be controlled to be increased, for example, by increasing the data transmitting size, to improve the system performance when the bus system is enough to allow more traffic and the traffic of the bus masters may be controlled to be decreased to prevent the system crash when the throughput of a specific bus increases unexpectedly.

For example, the bus masters may include a graphic processing unit, a communication processing unit, a global navigation satellite system, a Wi-Fi module, etc.

For example, the communication processing unit may include at least one of a code division multiple access (CDMA) module, a long term evolution (LTE) module, a radio frequency (RF) module, an ultra wideband (UWB) module, a wireless local area network (WLAN) module and a worldwide interoperability for microwave access (WI-MAX) module.

The processor P1-1, P1-2 and P2-1 may perform various computational functions such as particular calculations and tasks. For example, the processor P1-1, P1-2 and P2-1 may be a CPU, a microprocessor, an application processor (AP), etc. In some example embodiments, the processor P1-1, P1-2 and P2-1 may include a single processor core or multiple processor cores. In some example embodiments, the processor P1-1, P1-2 and P2-1 may further include a cache memory that is located inside or outside the processor P1-1, P1-2 and P2-1.

Figure 2:
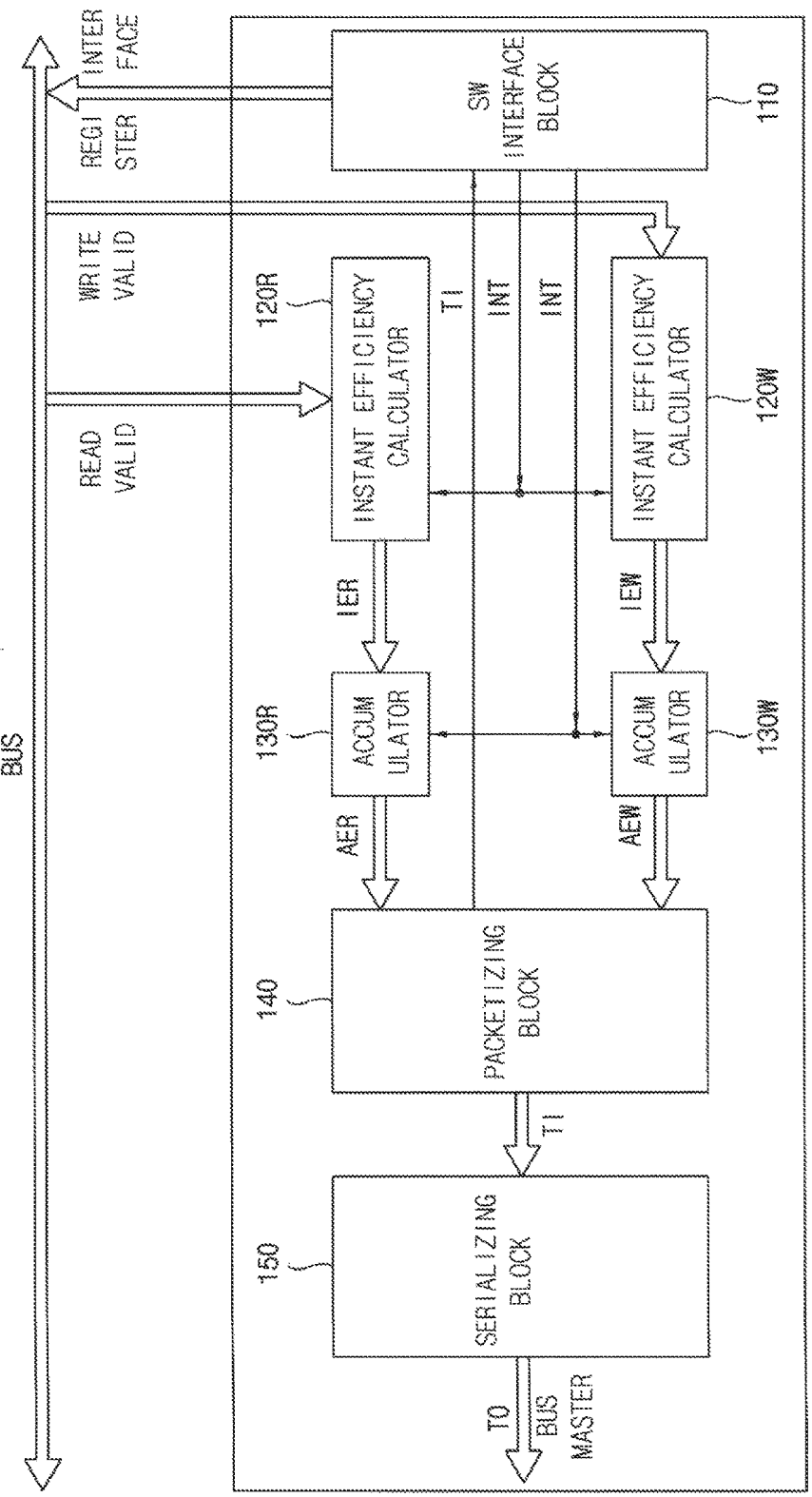
FIG. 2 is a block diagram illustrating a bus monitor of FIG. 1.

FIG. 2 is a block diagram illustrating the bus monitor BMO of FIG. 1. FIG. 3 is a conceptual diagram illustrating packetized traffic information of FIG. 2.

Referring to FIGS. 1 to 3, the bus monitor BMO includes a software interface block 110, an instant efficiency calculator 120R and 120W and an accumulator 130R and 130W.

The software interface block 110 receives a monitoring configuration to monitor the status of the bus. For example, the software interface block 110 may receive a monitoring interval INT. The software interface block 110 may output the monitoring interval INT to the instant efficiency calculator 120R and 120W and the accumulator 130R and 130W. For example, the software interface block 110 may receive a preset accumulating number of the accumulator 130R and 130W. The software interface block 110 may output the preset accumulating number to the accumulator 130R and 130W. For example, the software interface block 110 may receive the monitoring configuration and provide the bus traffic information to the software using a register.

The instant efficiency calculator 120R and 120W calculates an instant efficiency based on the monitoring configuration. Although the bus monitor BMO includes both a reading instant efficiency calculator 120R and a writing instant efficiency calculator 120W in FIG. 2, the present inventive concepts are not limited thereto. Alternatively, the bus monitor BMO may include only one of the reading instant efficiency calculator 120R and the writing instant efficiency calculator 120W.

The instant efficiency calculated by the instant efficiency calculator 120R and 120W may be defined as valid cycle/total cycle. The instant efficiency is defined as a ratio between the total cycle of the bus and the valid cycle of the bus.

The instant efficiency may include a reading instant efficiency IER and a writing instant efficiency IEW. For example, the reading instant efficiency calculator 120R may calculate the reading instant efficiency IER based on a ratio between the total cycle of the bus and a read valid cycle of the bus. For example, the writing instant efficiency calculator 120W may calculate the writing instant efficiency IEW based on a ratio between the total cycle of the bus and a write valid cycle of the bus.

The accumulator 130R and 130W may calculate an average efficiency AER and AEW by accumulating the instant efficiency IER and JEW based on the monitoring configuration. The average efficiency AER and AEW may be calculated by accumulating M instant efficiencies IER and IEW and dividing the M accumulated instant efficiencies by M. Herein, M is a natural number equal to or greater than 2. Although the bus monitor BMO includes both a reading accumulator 130R and a writing accumulator 130W in FIG. 2, the present inventive concepts are not limited thereto. Alternatively, the bus monitor BMO may include only one of the reading accumulator 130R and the writing accumulator 130W.

The average efficiency may include a reading average efficiency AER and a writing average efficiency AEW. For example, the reading accumulator 130R may calculate the reading average efficiency AER by accumulating the reading instant efficiencies IER and dividing the accumulated reading instant efficiencies IER by the preset accumulating number. For example, the writing accumulator 130W may calculate the writing average efficiency AEW by accumulating the writing instant efficiencies IER and dividing the accumulated writing instant efficiencies IER by the preset accumulating number.

The bus monitor BMO may further include a packetizing block 140 packetizing the monitoring configuration and the average efficiency to generate the bus traffic information TI.

The bus traffic information TI generated by the bus monitor BMO may have a predetermined packet type. The bus traffic information TI is transmitted to the bus master BM. The packetizing block 140 generates the bus traffic information TI in the packet type.

As shown in FIG. 3, for example, the bus traffic information TI may include the monitoring interval INT of the bus monitor BMO, the accumulating number of the accumulator 130R and 130W and the average efficiency. For example, the bus traffic information TI may include the monitoring interval INT of L bits, the accumulating number of M bits of the instant efficiencies by the accumulator 130R and 130W, the writing average efficiency of N bits and the reading average efficiency of N bits.

The bus monitor BMO may further include a serializing block 150 serializing the bus traffic information TI. The bus traffic information TI may be serialized to reduce the number of interface wires between the bus monitor BMO and the bus master BM.

The bus monitor BMO merely refers the bus traffic so that the bus monitor BMO does not deteriorate the performance of the bus. In addition, the monitoring interval INT may be set by the software through a control register. In addition, the bus traffic information TI may be transmitted to the bus master BM. The bus traffic information TI is directly read by the software through a status register of the bus monitor BMO.

Figure 4:
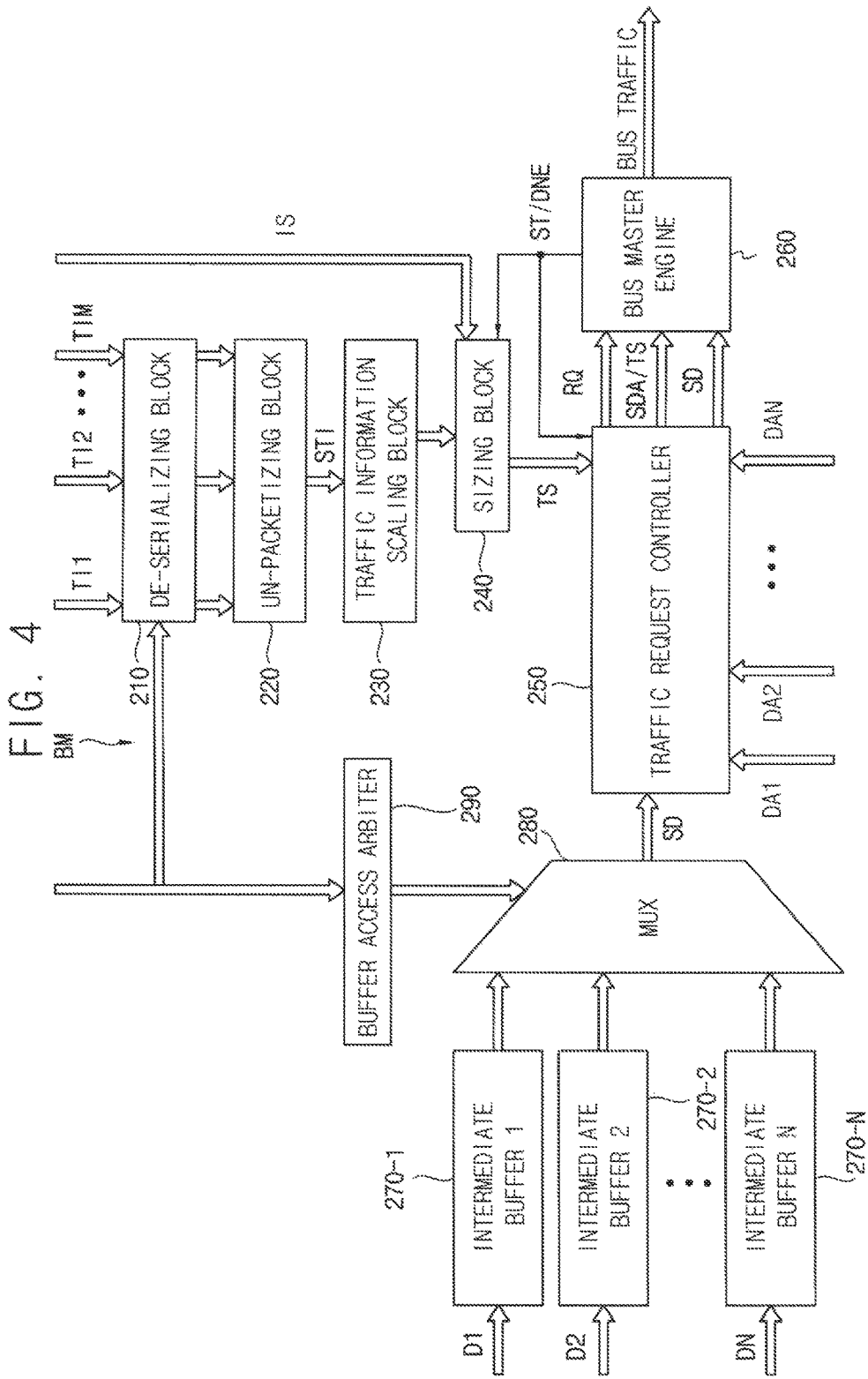
FIG. 4 is a block diagram illustrating a bus master of FIG. 1.
Figure 5:
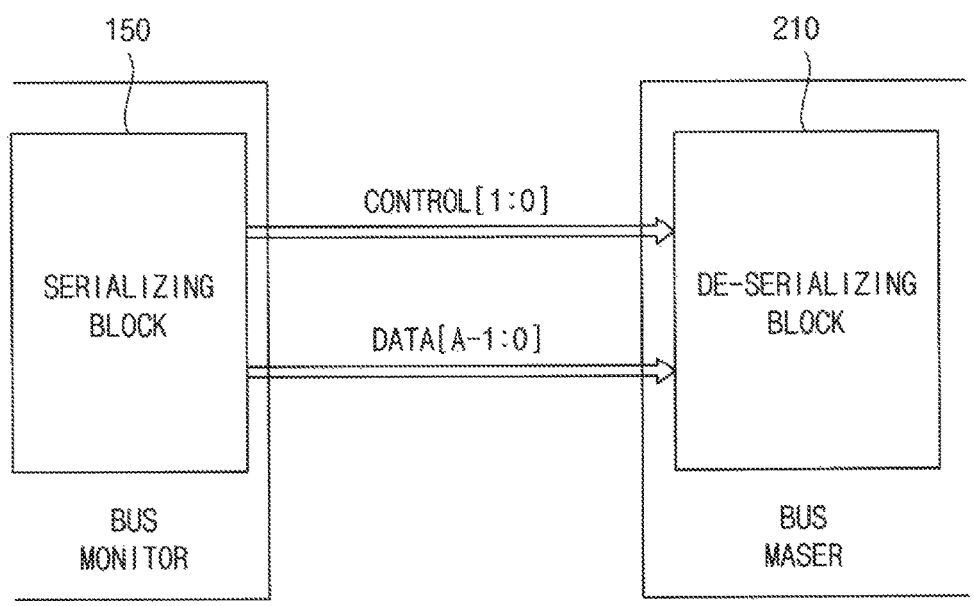
FIGS. 5 and 6 are conceptual diagrams illustrating communication between the bus monitor of FIG. 1 and the bus mater of FIG. 1.
Figure 6:
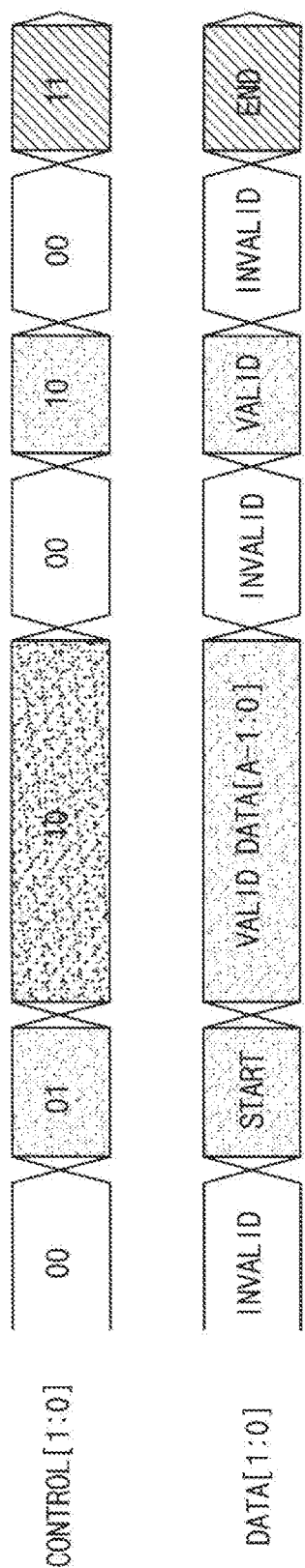

FIG. 4 is a block diagram illustrating the bus master BM of FIG. 1. FIGS. 5 and 6 are conceptual diagrams illustrating communication between the bus monitor BMO of FIG. 1 and the bus mater BM of FIG. 1.

Referring to FIGS. 1 to 4, the bus master BM includes the bus traffic control apparatus.

The bus traffic control apparatus includes a sizing block 240, a traffic request controller 250 and a bus master engine 260.

The sizing block 240 determines a data transmitting size TS of the bus master BM based on the bus traffic information TI received from the bus monitor BMO. For example, the data transmitting size TS of the bus master BM may be updated for every request. For example, the sizing block 240 may determine the present data transmitting size TS by increasing or decreasing the previous data transmitting size. The sizing block 240 may receive an initial data transmitting size IS from the software. Increment and decrement of the data transmitting size TS may be preset for clients as table types.

The traffic request controller 250 may control the data transmission of the bus master BM based on data D1, D2, . . . , DN, destinations of the data DA1, DA2, . . . , DAN and the data transmitting size TS.

The traffic request controller 250 may output the selected data SD, the destination SDA of the selected data SD, the data transmitting size TS and a request RQ to the bus master engine 260.

The bus master engine 260 transmits the data SD to the destination SDA in the data transmitting size TS based on the data SD, the destination SDA of the data SD, the data transmitting size TS and the request RQ received from the traffic request controller 250.

The bus master engine 260 may output a data transmitting start signal ST and a data transmitting end signal DNE to the sizing block 240 and the traffic request controller 250.

The sizing block 240 generates the next data transmitting size in response to the data transmitting end signal DNE. The traffic request controller 250 outputs the selected data SD, the destination SDA of the data SD, the data transmitting size TS and the request RQ to the bus master engine 260 in response to the data transmitting end signal DNE.

The bus traffic control apparatus may further include a traffic information scaling block 230. The traffic information scaling block 230 scales the bus traffic information received from the plurality of bus monitors and transmits the scaled bus traffic information to the sizing block 240.

For example, the traffic information scaling block 230 may scale the bus traffic information of the bus monitors based on weights of the bus monitors received from the software.

The bus traffic control apparatus may further include an unpacketizing block 220. The unpacketizing block 220 unpacketizes the packetized bus traffic information TI by the packetizing block 140 of the bus monitor BMO.

For example, the unpacketizing block 220 may unpacketize the packetized bus traffic information TI as shown in FIG. 3 and determine the monitoring interval INT of the bus monitor BMO, the accumulating number of the instant efficiency of the accumulator 130R and 130W, the average efficiency (e.g. the writing average efficiency and the reading average efficiency). The unpacketizing block 220 may output the unpacketized bus traffic information STI to the traffic scaling block 230.

The bus traffic control apparatus may further include a deserializing block 210. The deserializing block 210 deserializes the serialized bus traffic information TI by the serializing block 150 of the bus monitor BMO.

When the bus monitor BMO includes both the packetizing block 140 and the serializing block 150 and the bus traffic control apparatus includes both the deserializing block 210 and the unpacketizing block 220, the bus monitor BMO may packetize the bus traffic information TI first and then serialize the packetized traffic information TI. The bus traffic control apparatus may deserialize the serialized traffic information TI first and then unpacketize the deserialized traffic information TI.

Referring to FIGS. 5 and 6, the serializing block 150 of the bus monitor BMO transmits a control signal and the data to the deserializing block 210 of the bus master BM.

For example, the serializing block 150 of the bus monitor BMO may transmit the control signal of two bits and the data of A bits to the deserializing block 210 of the bus master BM.

For example, the control signal of "00" may mean an invalid status of the data, the control signal of "01" may mean a start of the data transmission, the control signal of "10" may mean a valid status of the data and the control signal of "11" may mean an end of the data transmission.

The deserializing block 210 of the bus master BM latches the start signal of the data transmission to realize the start of the valid data, latches the valid data, deserializes the valid serial data and latches the end signal of the data transmission to realize the end of the serial data.

The bus traffic control apparatus may further include a plurality of intermediate buffers 270-1, 270-2, . . . , 270-N receiving the data, the buffer access arbiter 290 selecting one of the data of the intermediate buffers 270-1, 270-2, . . . , 270-N and a multiplexer 280 connected to the intermediate buffers 270-1, 270-2, . . . , 270-N and the buffer access arbiter 290 and outputting the selected data SD by the intermediate buffers 270-1, 270-2, . . . , 270-N and the buffer access arbiter 290.

The traffic request controller 250 may receive the destinations DA1, DA2, . . . , DAN from the software corresponding to the data D1, D2, . . . , DN received from the intermediate buffers 270-1, 270-2, . . . , 270-N.

The data D1, D2, DN may be inputted from the clients to the intermediate buffers 270-1, 270-2, . . . , 270-N.

The buffer access arbiter 290 may determine to output which one of the data of the intermediate buffers 270-1, 270-2, . . . , 270-N. The buffer access arbiter 290 may receive an arbitration scheme from the software and determine to output which one of the data of the intermediate buffers 270-1, 270-2, . . . , 270-N based on the arbitration scheme.

According to the present exemplary embodiment, the bus system determines the data transmitting size TS of the bus master BM based on the bus traffic information TI and transmits the data SD to the destination SDA in the data transmitting size TS. Accordingly, when the throughput of a specific bus increases unexpectedly, the traffic generated by the bus masters BM may be gradually decreased in a range not affecting a system performance. When the problem of the throughput of the specific bus is solved, the traffic may be gradually increased. Thus, the unexpected increase of the throughput of the specific bus may be solved without system crash.

In addition, when a specific bus is enough to allow more traffic, the bus masters BM connected to the specific bus may generate more traffic to improve the system performance.

Therefore, the traffic of the bus system may be maintained in the optimal condition, the system crash is prevented, and the system performance may be improved.

Figure 7:
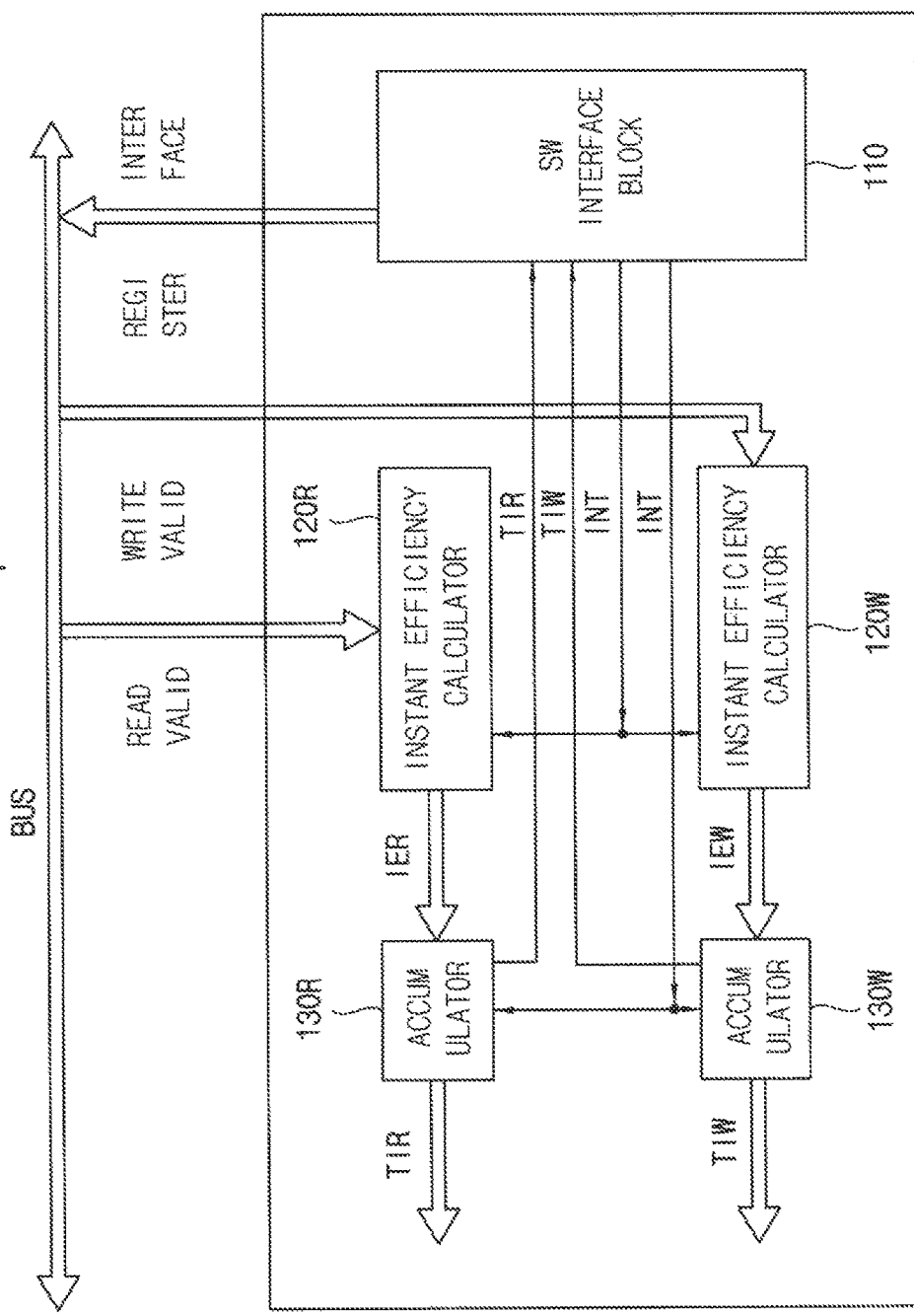
FIG. 7 is a block diagram illustrating a bus monitor according to an example embodiment.
Figure 8:
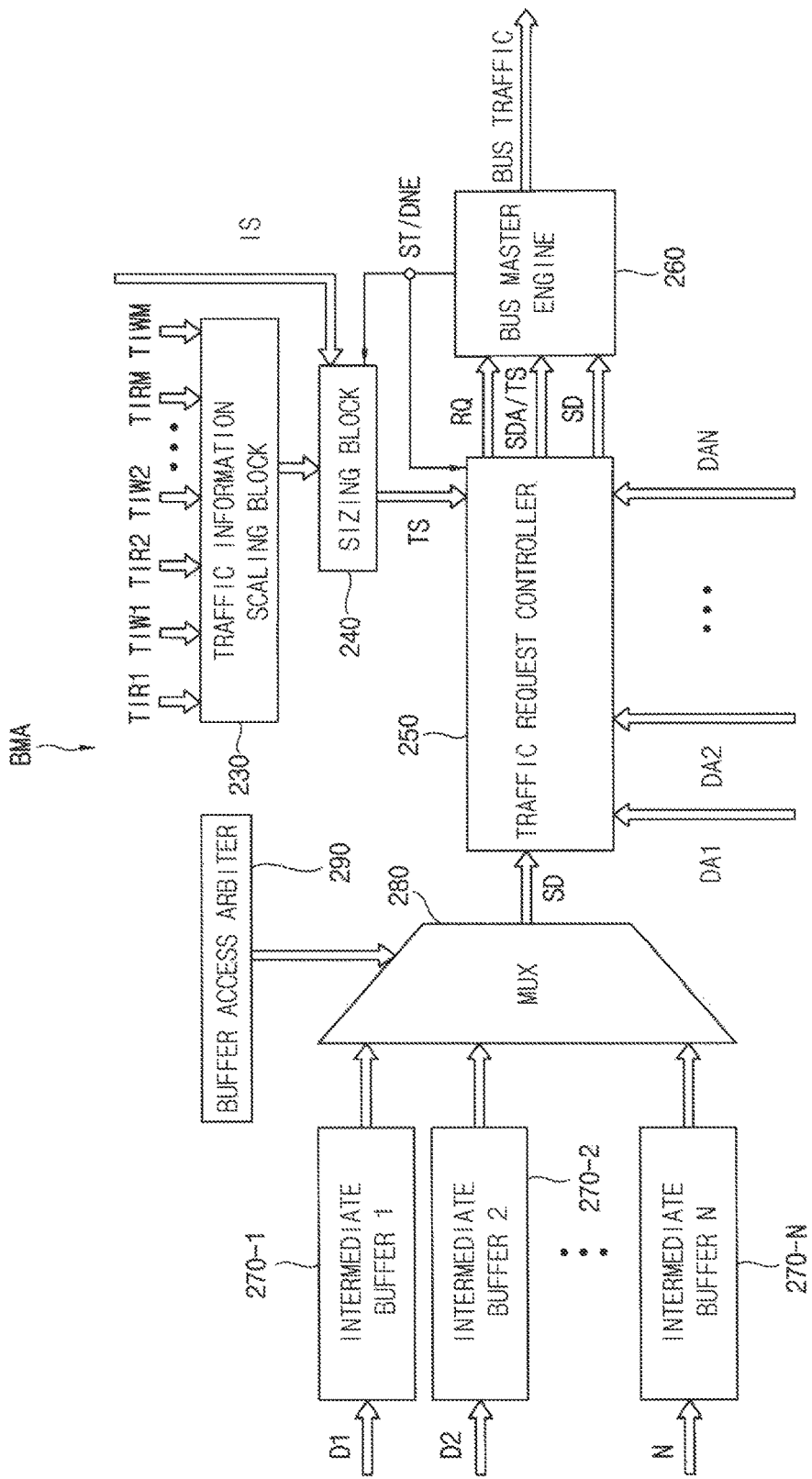
FIG. 8 is a block diagram illustrating a bus master according to an example embodiment.

FIG. 7 is a block diagram illustrating a bus monitor according to an exemplary embodiment. FIG. 8 is a block diagram illustrating a bus master according to an exemplary embodiment.

The bus system according to the present exemplary embodiment is substantially the same as the bus system of the previous exemplary embodiment explained referring to FIGS. 1 to 6 except that the bus monitor does not include the packetizing block and the serializing block and the bus master does not include the unpacketizing block and the deserializing block. Thus, the same reference numerals will be used to refer to the same or like parts as those described in the previous exemplary embodiment of FIGS. 1 to 6 and any repetitive explanation concerning the above elements will be omitted.

Referring to FIGS. 1, 7 and 8, the bus system includes a bus transmitting data, a bus monitor connected to the bus and determining bus traffic information, a plurality of bus masters connected to the bus and generating a control and a plurality of bus slaves connected to the bus and receiving or outputting the data according to the control of the bus master. The bus system may further include a processor connected to the bus.

At least one of the bus masters includes a bus traffic control apparatus. The bus traffic control apparatus may receive the bus traffic information from the bus monitors and adjust a data transmitting size of the bus mater based on the bus traffic information.

The bus monitor BMOA includes a software interface block 110, an instant efficiency calculator 120R and 120W and an accumulator 130R and 130W.

The software interface block 110 receives a monitoring configuration to monitor the status of the bus. For example, the software interface block 110 may receive a monitoring interval INT. The software interface block 110 may output the monitoring interval INT to the instant efficiency calculator 120R and 120W and the accumulator 130R and 130W.

For example, the software interface block 110 may receive a preset accumulating number of the accumulator 130R and 130W. The software interface block 110 may output the preset accumulating number to the accumulator 130R and 130W. For example, the software interface block 110 may receive the monitoring configuration and provide the bus traffic information to the software using a register.

The instant efficiency calculator 120R and 120W calculates an instant efficiency based on the monitoring configuration. Although the bus monitor BMOA includes both a reading instant efficiency calculator 120R and a writing instant efficiency calculator 120W in FIG. 7, the present inventive concepts are not limited thereto. Alternatively, the bus monitor BMOA may include only one of the reading instant efficiency calculator 120R and the writing instant efficiency calculator 120W.

The instant efficiency calculated by the instant efficiency calculator 120R and 120W may be defined as valid cycle/ total cycle. The instant efficiency is defined as a ratio between the total cycle of the bus and the valid cycle of the bus.

The instant efficiency may include a reading instant efficiency IER and a writing instant efficiency IEW. For example, the reading instant efficiency calculator 120R may calculate the reading instant efficiency IER based on a ratio between the total cycle of the bus and a read valid cycle of the bus. For example, the writing instant efficiency calculator 120W may calculate the writing instant efficiency IEW based on a ratio between the total cycle of the bus and a write valid cycle of the bus.

The accumulator 130R and 130W may calculate an average efficiency by accumulating the instant efficiency IER and IEW based on the monitoring configuration. The average efficiency may be calculated by accumulating M instant efficiencies IER and IEW and dividing the M accumulated instant efficiencies by M. Herein, M is a natural number equal to or greater than 2. Although the bus monitor BMOA includes both a reading accumulator 130R and a writing accumulator 130W in FIG. 7, the present inventive concepts are not limited thereto. Alternatively, the bus monitor BMOA may include only one of the reading accumulator 130R and the writing accumulator 130W.

The average efficiency may include a reading average efficiency and a writing average efficiency. For example, the reading accumulator 130R may calculate the reading average efficiency by accumulating the reading instant efficiencies IER and dividing the accumulated reading instant efficiencies IER by the preset accumulating number. For example, the writing accumulator 130W may calculate the writing average efficiency by accumulating the writing instant efficiencies IER and dividing the accumulated writing instant efficiencies IER by the preset accumulating number.

In the present exemplary embodiment, the average efficiency may be the bus traffic information TIR and TIW. The bus traffic information may include reading bus traffic information TIR and writing bus traffic information TIW. The accumulator 130R and 130W may output the bus traffic information. TIR and TIW to the bus master BMA.

The bus master BMA includes the bus traffic control apparatus.

The bus traffic control apparatus includes a sizing block 240, a traffic request controller 250 and a bus master engine 260.

The sizing block 240 determines a data transmitting size TS of the bus master BMA based on the bus traffic information TI received from the bus monitor BMOA. For example, the data transmitting size TS of the bus master BMA may be updated for every request. For example, the sizing block 240 may determine the present data transmitting size TS by increasing or decreasing the previous data transmitting size.

The traffic request controller 250 may control the data transmission of the bus master BMA based on data D1, D2, ..., DN, destinations of the data DA1, DA2, ..., DAN and the data transmitting size TS.

The traffic request controller 250 may output the selected data SD, the destination SDA of the selected data SD, the data transmitting size TS and a request RQ to the bus master engine 260.

The bus master engine 260 transmits the data SD to the destination SDA in the data transmitting size TS based on the data SD, the destination SDA of the data SD, the data transmitting size TS and the request RQ received from the traffic request controller 250.

The bus master engine 260 may output a data transmitting start signal ST and a data transmitting end signal DNE to the sizing block 240 and the traffic request controller 250.

The sizing block 240 generates the next data transmitting size in response to the data transmitting end signal DNE. The traffic request controller 250 outputs the selected data SD, the destination SDA of the data SD, the data transmitting size TS and the request RQ to the bus master engine 260 in response to the data transmitting end signal DNE.

The bus traffic control apparatus may further include a traffic information scaling block 230. The traffic information scaling block 230 scales the bus traffic information TIR1, TIW1, TIR2, TIW2, ..., TIRM and TIWM received from the plurality of bus monitors and transmits the scaled bus traffic information to the sizing block 240.

For example, the traffic information scaling block 230 may scale the bus traffic information TIR1, TIW1, TIR2, TIW2, ..., TIRM and TIWM of the bus monitors based on weights of the bus monitors received from the software.

According to the present exemplary embodiment, the bus system determines the data transmitting size TS of the bus master BMA based on the bus traffic information TI and transmits the data SD to the destination SDA in the data transmitting size TS. Accordingly, when the throughput of a specific bus increases unexpectedly, the traffic generated by the bus masters BMA may be gradually decreased in a range not affecting a system performance. When the problem of the throughput of the specific bus is solved, the traffic may be gradually increased. Thus, the unexpected increase of the throughput of the specific bus may be solved without system crash.

In addition, when a specific bus is enough to allow more traffic, the bus masters BMA connected to the specific bus may generate more traffic to improve the system performance.

Therefore, the traffic of the bus system may be maintained in the optimal condition, the system crash is prevented, and the system performance may be improved.

Figure 9:
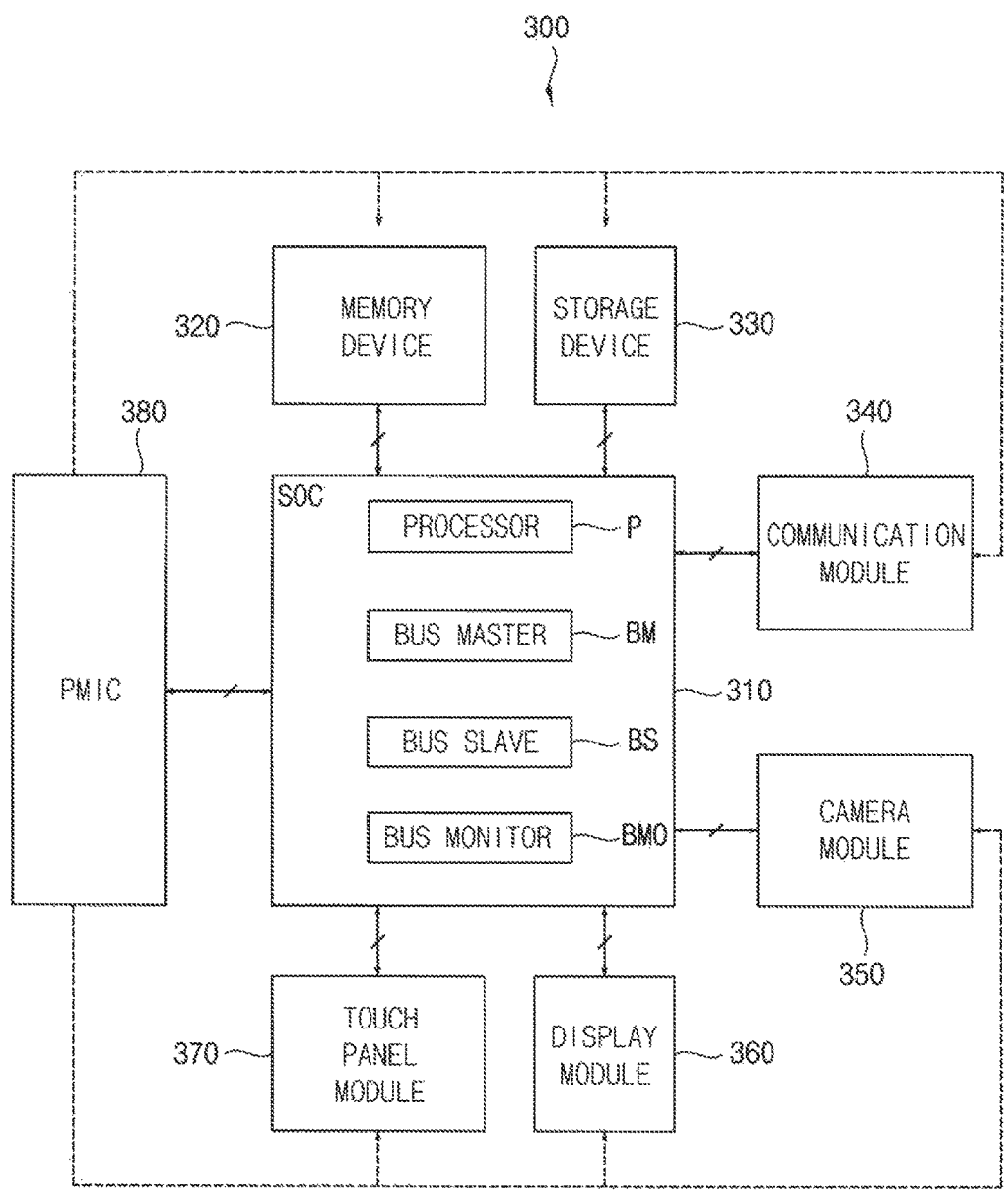
FIG. 9 is a block diagram illustrating an electronic system according to an example embodiment.

FIG. 9 is a block diagram illustrating an electronic system according to an exemplary embodiment.

Referring to FIG. 9, the electronic system 300 includes a system on chip (SOC) 310, a plurality of functional modules 340, 350, 360 and 370. The electronic system 300 may further include a memory device 320, a storage device 330 and a power management device 380.

The SOC 310 controls overall operations of the electronic system 300. For example, the SOC 310 controls the memory device 320, the storage device 330 and the plurality of functional modules 340, 350, 360 and 370. The SOC 310 may be the bus system in FIG. 1. The SOC 310 may include the processor P, the bus master BM, the bus slave BS and the bus monitor BMO.

The memory device 320 and the storage device 330 may store data for the operations of the electronic system 300. The memory device 320 may include a volatile memory device. The storage device 330 may include a nonvolatile memory device.

The electronic system 300 may include a communication module 340 operating a communication function, a camera module 350 operating a camera function, a display module 360 operating a displaying function, a touch panel module 370 operating a touch input function.

The power management device 380 may provide an operating voltage to the SOC 310, the memory device 320, the storage device 330 and the functional modules 340, 350, 360 and 370.

The present disclosure may be used in various kinds of bus systems or a system including the bus systems, such as a mobile phone, a smart phone, a PDA, a PMP, a digital camera, a digital television, a set-top box, a music player, a portable game console, a navigation device, a PC, a server computer, a workstation, a tablet computer, a laptop computer, a smart card, a printer, etc.

The foregoing is illustrative of some example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A bus traffic control apparatus comprising:
   a sizing block configured to determine a data transmitting size of a bus master based on bus traffic information;
   a traffic request controller configured to control transmission of data from the bus master based on the data, a destination of the data, and the data transmitting size; and
   a bus master engine configured to transmit the data to the destination in the data transmitting size based on the data, the destination of the data, and the data transmitting size and a request received from the traffic request controller;
   wherein the bus traffic control apparatus further includes at least one of,
      a traffic information scaling block configured to scale unscaled bus traffic information received from a plurality of bus monitors and transmit the bus traffic information to the sizing block,
      a deserializing block configured to deserialize serialized bus traffic information, and transmit bus traffic information to the sizing block, and
      an unpacketizing block configured to unpacketize packetized bus traffic information, and transmit bus traffic information to the sizing block.

2. The bus traffic control apparatus of claim 1, wherein the bus master engine is configured to output a data transmitting start signal and a data transmitting end signal to the sizing block and the traffic request controller.

3. The bus traffic control apparatus of claim further comprising:
the traffic information scaling block configured to scale unscaled bus traffic information received from a plurality of bus monitors and transmit the bus traffic information to the sizing block.

4. The bus traffic control apparatus of claim 1, further comprising:
the deserializing block configured to deserialize serialized bus traffic information, and transmit bus traffic information to the sizing block.

5. The bus traffic control apparatus of claim 1, further comprising:
the unpacketizing block configured to unpacketize packetized bus traffic information, and transmit bus traffic information to the sizing block.

6. The bus traffic control apparatus of claim 1, further comprising:
a plurality of intermediate buffers configured to receive the data;
a buffer access arbiter configured to select the data from one of the plurality of intermediate buffers; and
a multiplexer connected to the intermediate buffers and configured to transmit the data by the buffer access arbiter to the traffic request controller.

7. A bus system comprising:
a bus configured to transmit data;
at least one bus monitor connected to the bus and configured to determine bus traffic information;
a plurality of bus masters connected to the bus and configured to generate control signals; and
a plurality of bus slaves connected to the bus and configured to receive or output the data according to the control signals of the plurality of bus masters,
wherein at least one of the plurality of bus masters includes a bus traffic control apparatus, the bus traffic control apparatus includes,
a sizing block configured to determine a data transmitting size of the bus master based on the bus traffic information,
a traffic request controller configured to control data transmission of the bus master based on the data, a destination of the data, and the data transmitting size, and
a bus master engine configured to transmit the data to the destination in the data transmitting size based on the data, the destination of the data, the data transmitting size and a request received from the traffic request controller,
wherein the at least one bus monitor includes a software interface block configured to receive a monitoring configuration to monitor a status of the bus.

8. The bus system of claim 7, wherein the at least one bus monitor further includes:
an instant efficiency calculator configured to calculate an instant efficiency of the bus based on the monitoring configuration; and
an accumulator configured to calculate an average efficiency of the bus by accumulating the instant efficiency based on the monitoring configuration.

9. The bus system of claim 7, wherein
the plurality of bus masters includes a first bus master and a second bus master, the first bus master including a first bus traffic control apparatus and the second bus master including a second bus traffic control apparatus,
the at least one bus monitor includes a plurality of bus monitors,
at least one of the plurality of bus monitors is connected to the first bus master, and
at least one other of the plurality of bus monitors is connected to the second bus master.

10. The bus system of claim 7, wherein the bus system further comprises at least one priority bus master, the priority bus master not including the bus traffic control apparatus.

11. The bus system of claim 8, wherein the instant efficiency is defined as a ratio between a total cycle of the bus and a valid cycle of the bus.

12. The bus system of claim 8, wherein the at least one bus monitor further comprises a packetizing block configured to packetize the average efficiency to generate the bus traffic information.

13. The bus system of claim 8, wherein the at least one bus monitor further comprises a serializing block configured to serialize the bus traffic information.

14. The bus system of claim 12, wherein the bus traffic control apparatus further comprises an unpacketizing block configured to unpacketize the bus traffic information.

15. The bus system of claim 13, wherein the bus traffic control apparatus further comprises a deserializing block configured to deserialize the bus traffic information.

16. A bus system comprising:
a bus configured to transmit data;
at least one bus monitor configured to determine bus traffic information based on bus traffic on the bus; and
at least one bus master configured to
control the bus traffic on the bus based on the bus traffic information, data received by the at least one bus master, and a destination of the data received by the at least one bus master, the control including adjusting a data transmitting size for data transmitted through at least one bus master based on the bus traffic information such that the data transmitting size decreases in response to the bus traffic information indicating an increase in the bus traffic or the data transmitting size increases in response to the bus traffic information indicating a decrease in the bus traffic.

17. The bus system of claim 16, wherein the at least one bus master is configured to adjust the data transmitting size by decreasing the data transmitting size in response to the bus traffic information indicating an increase in the bus traffic.

18. The bus system of claim 16, wherein the at least one bus master is configured to adjust the data transmitting size by increasing the data transmitting size in response to the bus traffic information indicating a decrease in the bus traffic.

19. The bus system of claim 16, wherein the at least one bus master is configured to control the bus traffic on the bus via at least one bus slave.

20. The bus system of claim 16, further comprising:
a priority bus master, the priority bus master configured to control bus traffic on the bus independent of the bus traffic information.

* * * * *